US007865827B2

(12) United States Patent
Ball et al.

(10) Patent No.: US 7,865,827 B2
(45) Date of Patent: Jan. 4, 2011

(54) METHOD FOR OPERATING A DATA PROCESSING SYSTEM

(75) Inventors: Keith Ball, Munich (DE); Rudolf Kaertner, Germering (DE)

(73) Assignee: Brainloop AG, Munich (DE)

( * ) Notice: Subject to any disclaimer, the term of this patent is extended or adjusted under 35 U.S.C. 154(b) by 875 days.

(21) Appl. No.: 11/536,983

(22) Filed: Sep. 29, 2006

(65) Prior Publication Data

US 2007/0156738 A1 Jul. 5, 2007

(30) Foreign Application Priority Data

Sep. 30, 2005 (DE) .................. 10 2005 047 133

(51) Int. Cl.
*G06F 17/21* (2006.01)
(52) U.S. Cl. .............. 715/277; 715/251; 715/255; 715/276
(58) Field of Classification Search ............ 715/255, 715/277, 251, 276
See application file for complete search history.

(56) References Cited

U.S. PATENT DOCUMENTS

| 6,671,853 | B1 * | 12/2003 | Burkett et al. ............... 715/235 |
| 6,772,337 | B1 | 8/2004 | Yener |
| 6,857,102 | B1 * | 2/2005 | Bickmore et al. ............ 715/205 |
| 6,925,595 | B1 * | 8/2005 | Whitledge et al. .......... 715/234 |
| 2001/0042045 | A1 * | 11/2001 | Howard et al. ................ 705/51 |
| 2002/0059367 | A1 * | 5/2002 | Romero et al. .............. 709/203 |
| 2003/0046318 | A1 * | 3/2003 | Schohn et al. .............. 707/513 |
| 2004/0034836 | A1 | 2/2004 | Ikeno |
| 2004/0091132 | A1 * | 5/2004 | Eguchi et al. ............... 382/100 |
| 2004/0205616 | A1 * | 10/2004 | Rosenberg et al. .......... 715/523 |
| 2005/0131887 | A1 * | 6/2005 | Rohrabaugh et al. ........... 707/3 |
| 2006/0015945 | A1 * | 1/2006 | Fields ......................... 726/27 |
| 2006/0031411 | A1 * | 2/2006 | Gimson et al. .............. 709/219 |

OTHER PUBLICATIONS

German Search Report dtd Feb. 13, 2006, DE Appln. No. 10 2005 047 133.1 (German language only).

* cited by examiner

*Primary Examiner*—Joshua D Campbell
(74) *Attorney, Agent, or Firm*—Banner & Witcoff, Ltd.

(57) ABSTRACT

A method for processing document data by a data processing system includes storing a first electronic file containing document data which represents a document which can be displayed for a user; converting the first file into third electronic files which, in combination, contain document data of the first file representing at least one portion of the document; and providing the third files for retrieval, for displaying the at least one portion of the document by a user. According to the method, the document may be "fragmented" before being provided for display by the user.

16 Claims, 5 Drawing Sheets

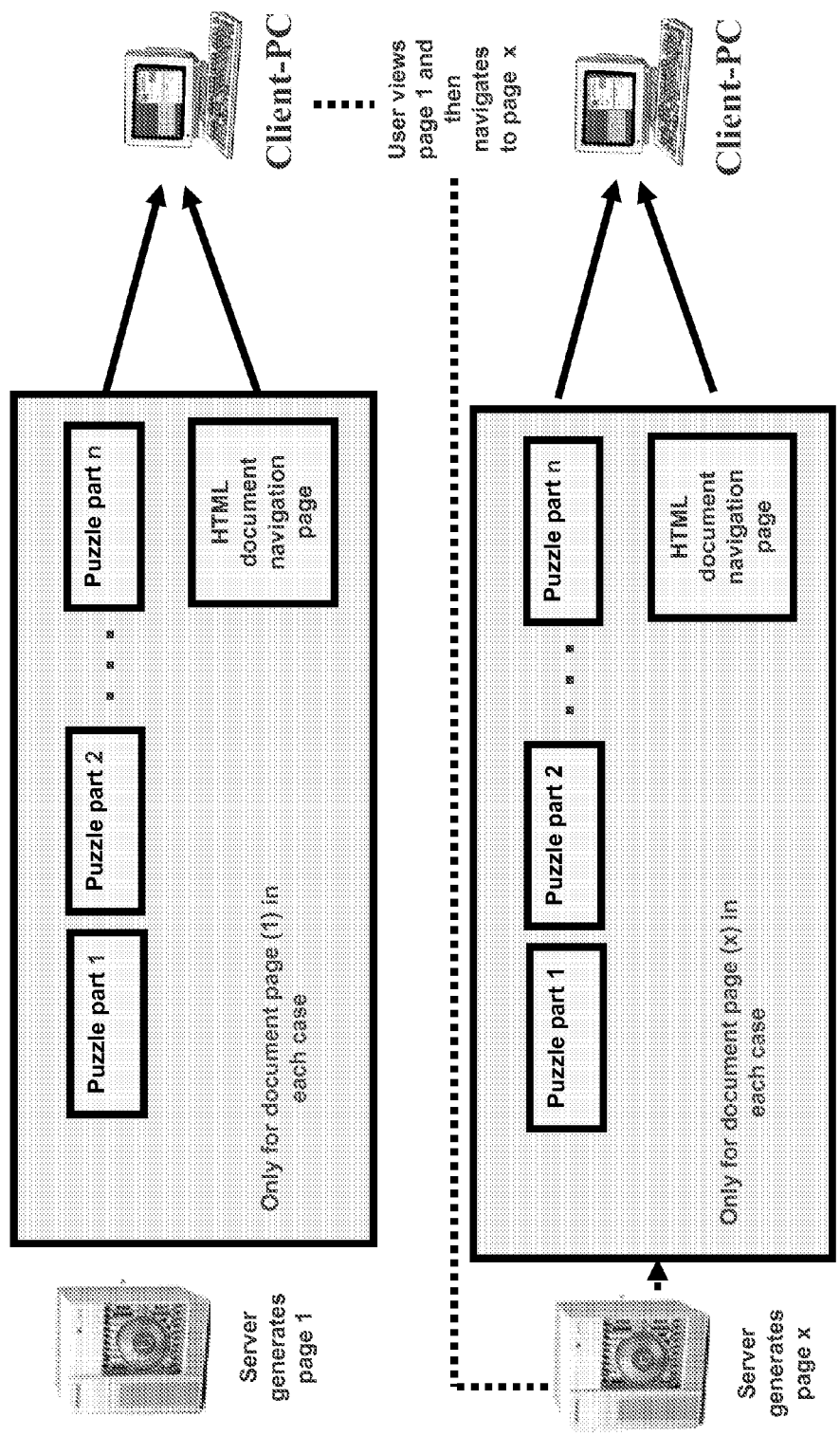

METHOD FOR OPERATING A DATA PROCESSING SYSTEM

CROSS REFERENCE TO RELATED APPLICATION

This application claims priority from German Patent Application No. 10 2005 047 133.1, filed Sep. 30, 2005, the entire contents of which are incorporated herein by reference.

FIELD

The present invention relates to a method for operating a data processing system and in particular to a method for electronic processing of document data to protect against undesirable or unauthorised access or manipulation.

BACKGROUND

When electronic documents are transmitted in networks, these documents should be protected against undesirable access. This concerns the end users (that is those for whom an electronic document is intended, hereinafter called users) and also system administrators of the user's computer, or "bad guys". For example, the user should be prevented from printing the document, forwarding it or storing it. System administrators should be prevented from being able to access the document despite having full read permissions on the user's computer. The "bad guys" can comprise hackers who want to create access to the user's computer, persons who are attempting to intercept the data traffic between the client (user's computer) and server ("data space"), as well as viruses, worms and trojans.

SUMMARY

It is the object of the invention to address this problem. In particular, documents which are provided on a server for retrieval by users should be protected against undesired access and manipulation. In particular, this protection should be provided on the server side so that no software needs to be installed on the user's computer. At the same, time the protection should be made independent of the format of the document to be protected as far as possible.

This is achieved by the invention as recited in the independent claims. Advantageous embodiments are recited from the dependent claims.

The invention provides a method for processing document data by means of a data processing system, comprising the following steps: storing a first electronic file containing document data which represents a document which can be displayed for a user; converting the first file into a plurality of third electronic files containing, in combination, document data of the first file representing at least one portion of the document; and providing the plurality of third files for retrieval, for displaying the at least one part of the document by a user.

According to the method according to the invention, the document is "fragmented" before being provided for display by the user. A complete part (e.g. one page) of the document is thus made available to the user for display; however, the document data representing these parts are distributed over a plurality of files. Instead of an individual document file, the user thus obtains a plurality of files. This makes it difficult to process the document data. For example, if the user wishes to print or store the displayed part of the document for example, the print or save command must be applied to each of the plurality of files. This prevents undesirable reuse of the document or makes it difficult. Consequently, display of at least one part of the document is made possible but its processing is prevented or at least made difficult. This functionality is advantageous in "data rooms" in which, for example, access can be made to confidential documents which should be prevented from being printed out, saved or forwarded by the user. At the same time, access from outside (administrators, "bad guys") is made difficult or, however the usefulness of document data when this has been accessed from outside is severely reduced.

In particular, the document can comprise one or more pages. According to one embodiment of the invention, access to the document is made exclusively page-by-page. That is, if the user requests a document anew, third files are first produced, which third files correspond to the first page of the document and these are made available to the user for display of the first page. If the user requests a further page, the third files are produced for this further page and made available to the user etc. According to this embodiment, access to the entire document "at once" is not possible.

According to one embodiment of the invention, the method comprises the following steps: converting the first file into a plurality of second electronic files containing the document data of the first file, wherein each of the second electronic files contains the document data of one page of the document; and converting the second files into the plurality of third files, wherein the document data of each second file is distributed over a plurality of third files.

In the first conversion step, a file is produced (second files) for each page of the document. In the second conversion step, each page of the document is individually "fragmented" and the corresponding data are stored in the third files.

Advantageously, each retrieval by the user is recorded. In particular, each retrieval by the user can be recorded on a page-by-page basis. The logging can also contain the identification of the user. It is thus possible to determine which user has retrieved which document at what time, or which parts of the document.

Each of the plurality of third files is preferably allocated a different name and this is correspondingly saved. For this purpose, each name can be selected by a random generator. Access to the third files by the user is accomplished individually by means of these names. The randomness of the names thus makes it difficult to systematically retrieve, process and reuse the document data.

In a preferred embodiment, the method comprises generation of control signals which deactivate pre-defined functions otherwise available to the user when the third files are retrieved by the user, in particular functions for printing, forwarding and/or saving the displayed part of the document. Thus, an undesired processing or reuse of the displayed part of the document is made more difficult or completely prevented.

In one embodiment, the method comprises the following additional steps: receiving an electronic file which contains the document data; converting the received file into the first file, wherein the first file has a first predetermined data format; and converting the first file into the plurality of second electronic files, wherein the second files have a certain predetermined data format.

Accordingly, the received document data, which are present in Word format, for example, are converted into a different format, e.g. PDF. The individual pages of the PDF document are then converted into the respective files of a further format, for example, the PNG format. The PNG-based representations of the document pages are then "fragmented", as described above, and the resulting picture data are preferably made available to the user page-by-page as an HTML-based representation.

In one advantageous embodiment, the method comprises the following additional steps: producing data which represents a watermark for the document; and adding the data which represents the watermark to the first file so that at least one part of the document contains the watermark when displayed by a user.

The use of watermarks makes any undesired use of the retrieved and displayed documents more difficult and can, for example, protect against photographing the user screen.

According to the invention, a method is also provided comprising the following steps: receiving, by a server, a request from a client for display of a document stored on the server; processing, by the server, of the document data of one page of the document stored on the server so that the document data of the page are distributed over a plurality of files; and providing, by the server, of the plurality of files, for displaying the page to the client.

The method preferably comprises repeating the steps of processing and provision at the request of the client for page-by-page display of the document to the client.

In addition, data processing systems and a computer program are provided, these being configured to carry out the method described above.

BRIEF DESCRIPTION OF THE DRAWINGS

The invention is now explained using exemplary embodiments with reference to the drawings. In the figures

FIG. 5 shows a further schematic diagram of the implementation of a method according to one embodiment of the invention.

DETAILED DESCRIPTION

Figure 1:
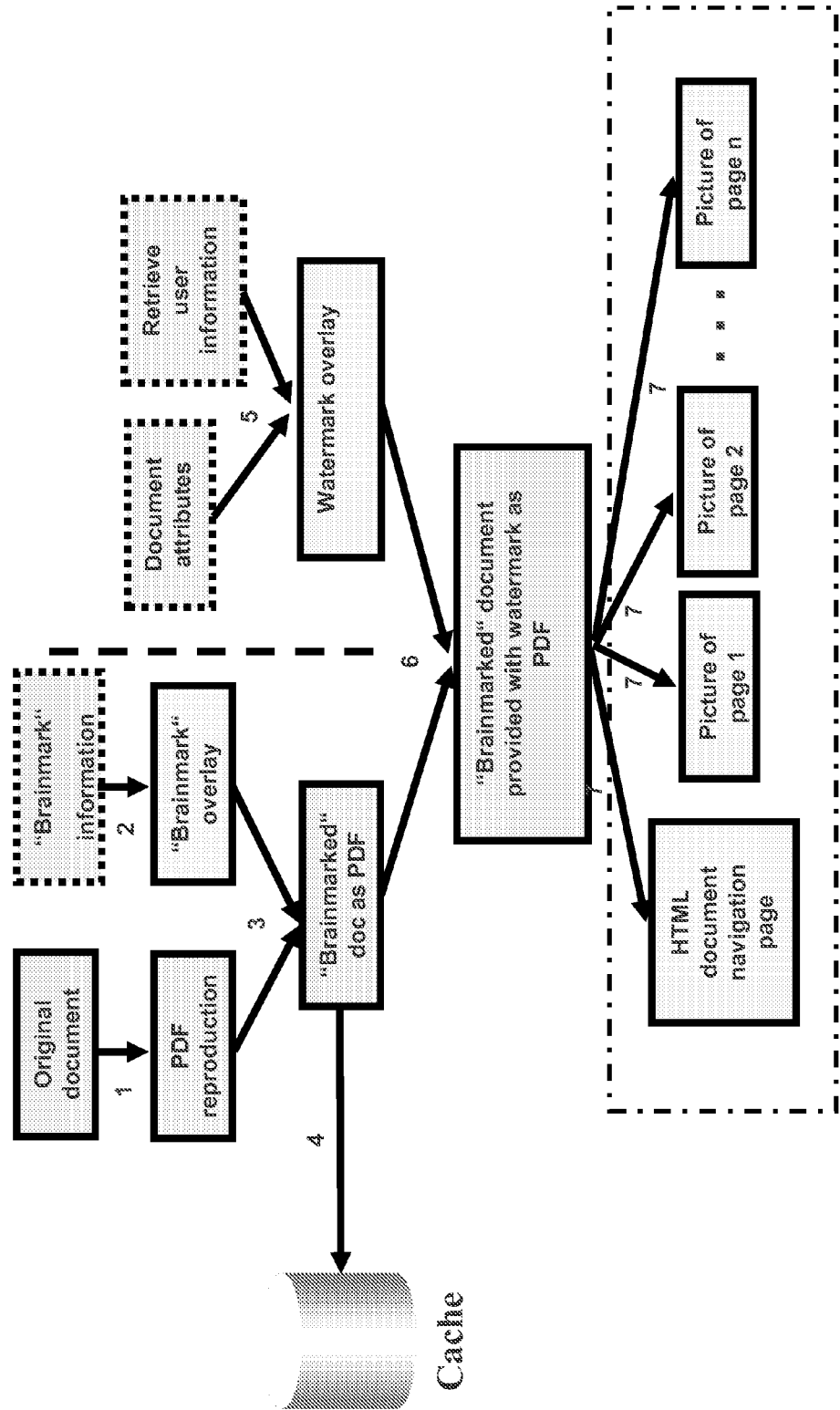
FIG. 1 is a schematic diagram showing the steps of a method according to one embodiment.

FIG. 1 is a schematic diagram showing the sequence of a method for data processing according to one embodiment of the invention. At the beginning of the method, a server receives a request from a user for retrieval of a document stored on the server. If the document is not saved in PDF format, a conversion is made in Step 1 and the PDF document produced is stored for later access.

Optionally a cover sheet is then generated for the requested document and placed at the front of the document as page 1 (not shown). The cover sheet can contain information on the document such as, for example, its version, originator etc.

Then in Step 2 so-called "brainmark" information and an overlay with this information is generated. The "brainmark" information comprises a unique designation of the document and/or the version of the document that has been requested by the user. In Step 3 the overlay is transferred to the PDF document and the resulting file is stored in a cache in Step 4.

Attributes of the requested document and information on the user is generated in Step 5. The attributes can comprise various properties of the document such as, for example "confidential", "draft" etc. The user information can comprise, for example, the name or the e-mail address of the user. A watermark is produced from this information and in Step 6 this watermark is transferred to each page of the PDF document (except for the cover sheet). The writing of the watermark is executed in such a manner that the watermark cannot be removed from the document either manually or technically without a disproportionately large effort.

In Step 7 the PDF document is converted into a picture format (e.g. PNG) page by page. The page which has just been requested is then "fragmented" i.e. broken down into individual parts, each individual part being saved on the server under a name generated by the random generator. An HTML representation of the individual picture parts and a navigation strip to navigate between the pages is produced to display such a fragmented page. The server thus delivers the respectively requested page to the user as a collection of individual pictures and HTML code. At the same time, retrieval and display of the requested page(n) on the server is logged. This process is repeated accordingly when a following page is requested. The document is thus displayed page by page and not in its entirety.

Figure 2:
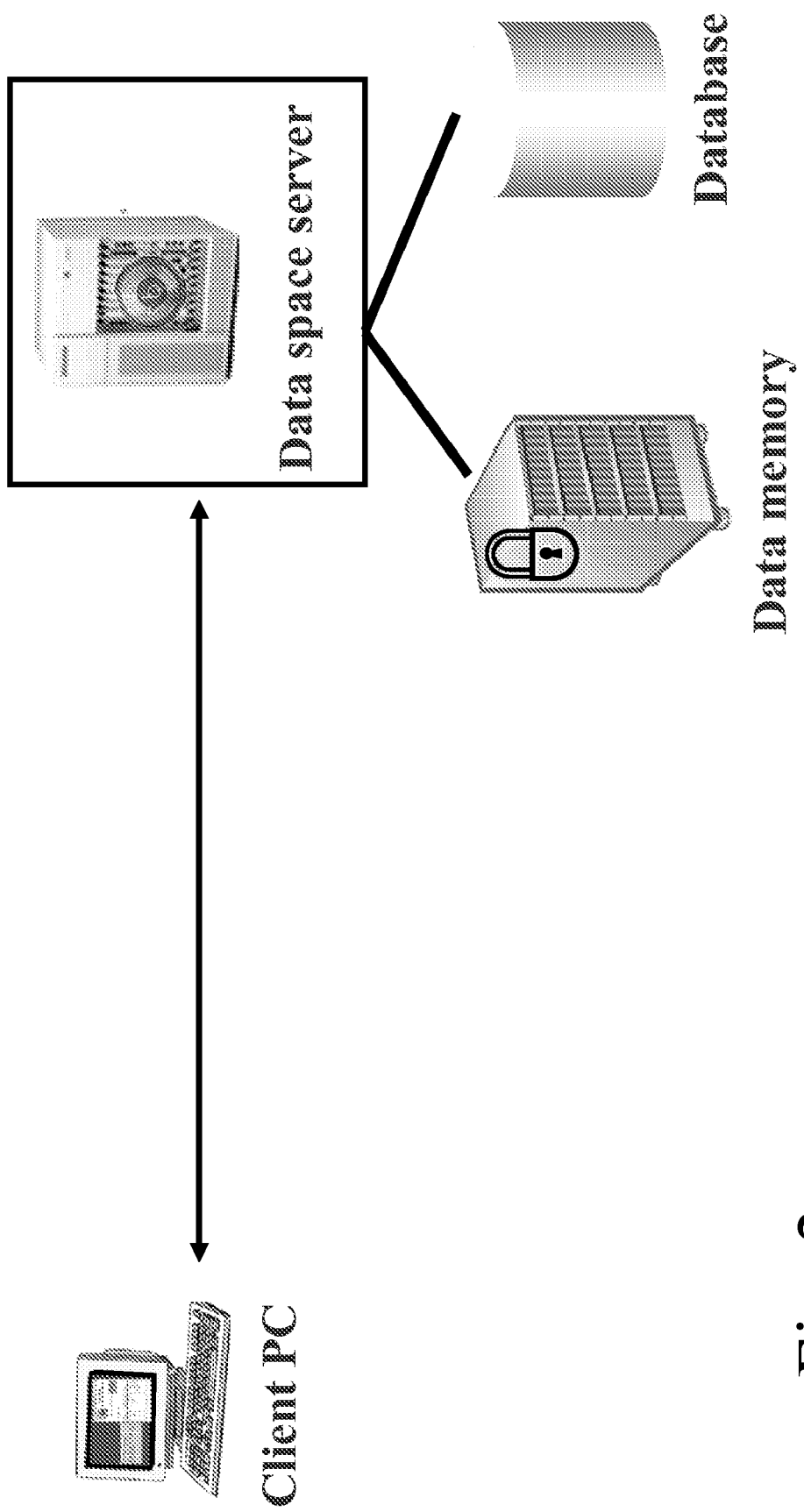
FIG. 2 is a data processing system suitable for implementing the method according to the invention.

FIG. 2 is a schematic diagram showing a data processing system with a client PC, a data space server, a data memory as well as a database for implementing the method according to the invention. The documents which can be retrieved by a user are stored in the data memory and/or the database. Retrieval is carried out by the user from the client PC. The method described above for processing the documents is implemented on the data space server. The data space server determines the form in which the user has access to the stored documents and what he can (cannot) do with these.

Figure 3:
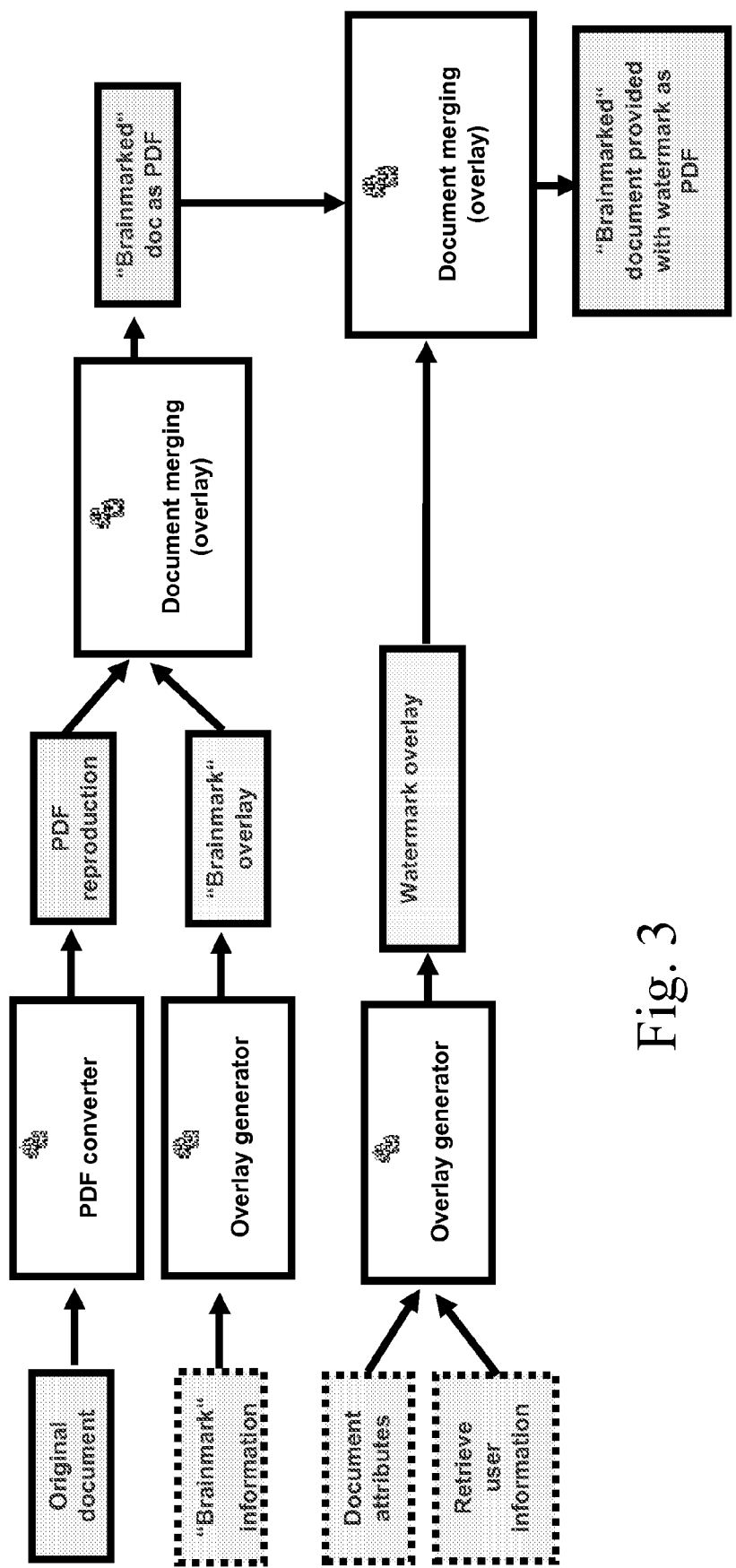
FIGS. 3 and 4 shows the steps and modules of a method or a device according to one embodiment of the invention.
Figure 4:
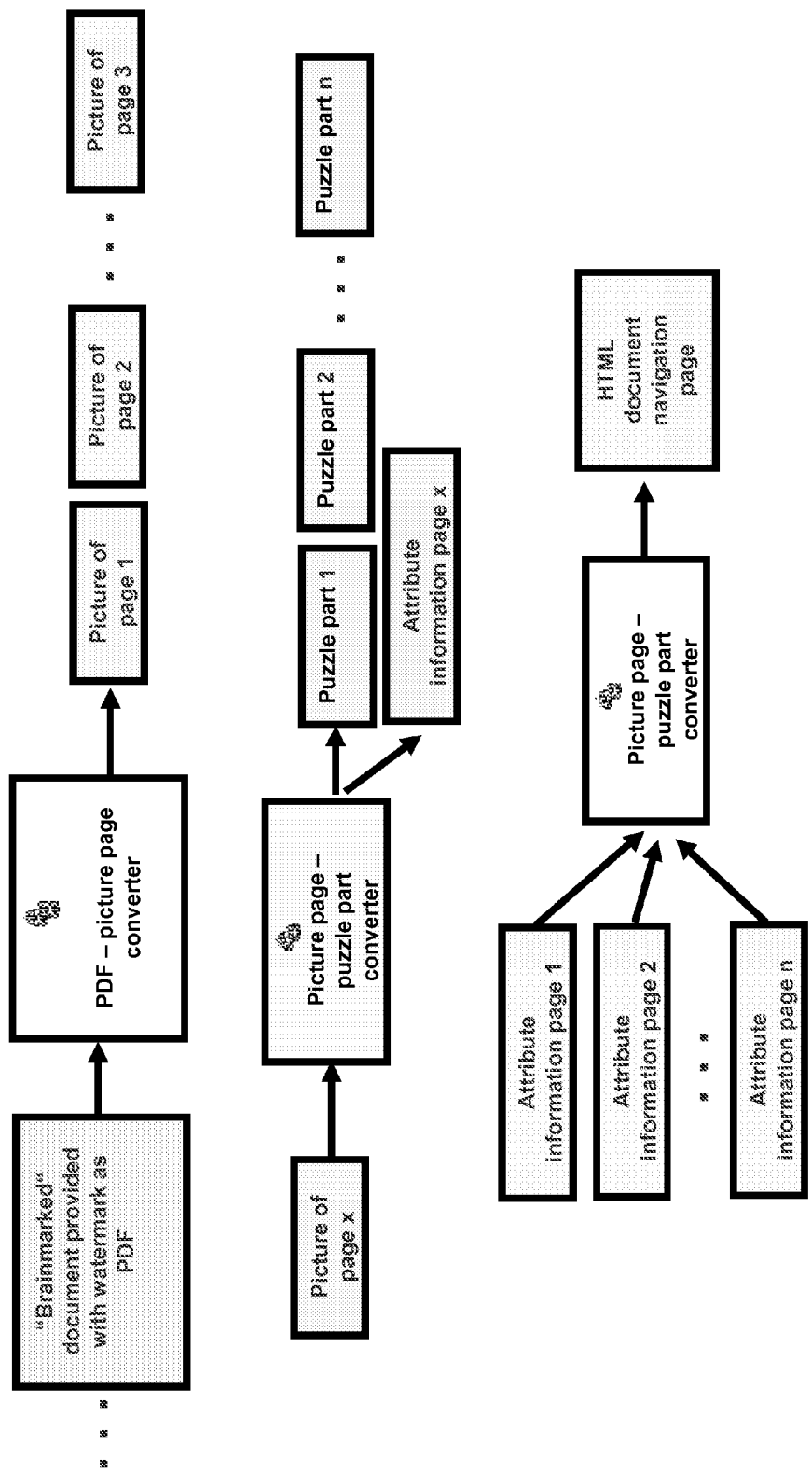

FIGS. 3 and 4 schematically illustrate methods and device according to one embodiment of the invention.

The method in particular comprises the following steps:

1. The document is converted into a standard form, in particular PDF.

2. A cover sheet is placed in front of the document. The cover sheet in particular contains information about the document and information about the user who is downloading the document.

3. The document is overlaid with a watermark. The watermark is formed in particular by the following information about the user who is downloading the document as well as by a "brainmark" (see above).

4. The document is converted into a picture format, for example, PNG.

5. The picture information representing the document is produced page by page and can only be retrieved page by page. The pages on the server page are generated dynamically in each case when scrolling through the document. Access to each individual page is logged in a data space history.

6. Each page of the document is divided into a configurable number of individual parts (puzzle/shredder analogue).

7. Each individual page of a document is given a name which is difficult to identify, produced by a random generator. That is, even if an unauthorised person were to obtain access to this document data (e.g. internet browser cache), it would be extremely laborious to compose this page again from the numerous individual parts.

8. The files with the individual parts of the document pages are technically characterised such that they are not or cannot be intermediately stored on the path from the server to the user's computer. In particular, this means that the files are not stored in the internet browser cache. This also applies to proxies and to the web server.

An exemplary data processing system for implementing this method comprises the following components:

PDF conversion module 10;

cover sheet generating module (not shown);

watermark generating module 11;

a module 12 for page-by-page conversion of the document in PDF format into a picture format (e.g. PNG);

a module 13 for "fragmenting" the picture information into a configurable number of individual parts, with a random generator for producing random file names for the individual parts; and a module 14 for delivering requested document data to a user, the module only allowing page-by-page retrieval, preventing "cacheing" and logging access page-by-page.

The sequence of the method in particular comprises the following steps:

1. A user selects a document for downloading.
2. If the document is not yet available as a PDF file, a conversion is carried out and the PDF file stored for later access.
3. If the cover sheet function is activated in the data space (server), the cover sheet is generated dynamically and placed before the document as the first page.
4. If the "watermarking" function is activated in the data space, all pages of the actual document (not the cover sheet) are overlaid with a watermark. The watermark is designed so that the entire content of the original document is legible but the watermark itself cannot be removed from the document with justifiable effort (either manually or technically).
5. The document is only converted page by page into a picture format (PNG).
6. The page to be displayed (i.e. requested by the user) is divided in a preset manner into a preset number of individual parts. The individual parts are saved under names generated by a random generator.
7. An HTML representation of a complete page is generated, containing the representation of the actual document page from the individual picture parts and a navigation strip for navigating between the document pages.
8. The delivery module delivers the respectively requested individual page to the user as a collection of individual pictures and HTML code and logs these processes. The delivery module is also responsible for generating the respectively requested following pages. In addition, the delivery module generates control signals which prevent the components (web server, internet browser) located between the server (data space) and client (user) from physically intermediately storing information in caches (hard disks or similar).

FIG. 5 again illustrates schematically the generation of the "document puzzle" by a server.

It should be noted that the exemplary embodiments described are merely of an exemplary nature and the invention comprises modifications within the scope of protection defined by the protective claims.

The invention claimed is:

1. A method for processing electronic document data on a server connected to at least one client, the method comprising the following steps:
   storing a first electronic file containing image data representing a document displayable by the client;
   converting the first electronic file into a plurality of second electronic files, wherein each of the second electronic files contains the document data of one page of the document for display, the document data of the first electronic file being distributed over the plurality of second electronic files;
   converting the second electronic files into a plurality of third electronic files, wherein the document data of each second electronic file is distributed over a configurable plurality of the third electronic files to fragment each page of the document for display;
   in response to a request from the client to display a page of the document, transmitting to the client the image data of the requested page as a collection of the third electronic files; and
   displaying an image representing the requested page, wherein the displayed image comprises a plurality of image fragments each corresponding to a respective one of the third electronic files, wherein predetermined commands can be applied to the displayed image only by applying the predetermined commands to each of the plurality of image fragments individually.

2. The method according to claim 1, comprising page-by-page provision for retrieval of the plurality of third electronic files for page-by-page display of the document by the client.

3. The method according to claim 2, comprising recording each retrieval of the third electronic files by the client.

4. The method according to claim 2, comprising recording each retrieval by the client page by page.

5. The method according to claim 1, comprising identification of the client and recording retrievals by the client.

6. The method according to claim 1, wherein each of the plurality of third electronic files is allocated a different name and each of the third electronic files is saved under the respectively allocated name.

7. The method according to claim 6, wherein the names are selected by a random generator.

8. The method according to claim 1, comprising generation of control signals which deactivate pre-defined functions otherwise available to the user when the third electronic files are retrieved by the client, in particular functions for printing, forwarding and/or saving the displayed portion of the document.

9. The method according to claim 1, comprising the following steps:
   receiving an electronic file which contains the document data:
   converting the received electronic file into the first electronic file, wherein the first electronic file has a first predetermined data format; and
   converting the first electronic file into the plurality of second electronic files, wherein the second electronic files have a second predetermined data format.

10. The method according to claim 9, wherein the first data format is the PDF format and the second data format is the PNG format.

11. The method according to claim 1, comprising provision of an HTML-based representation of the document.

12. The method according to claim 1, comprising the following steps:
   producing data which represents a watermark for the document; and
   adding the data which represents the watermark to the first electronic file so that at least one part of the document contains the watermark when displayed by the client.

13. A data processing system comprising a processor programmed to perform the method according to claim 1, and a memory for storing the first, second and third electronic files.

14. A data processing program comprising machine-readable instructions for performing the steps of the method according to claim 1, by means of a data processing device comprising a processor and a memory for storing the first, second and third electronic files.

15. A memory on which the data processing program according to claim 14 is stored.

16. A data processing system comprising a server and at least one client, arranged to carry out the method according to claim 1.

* * * * *